July 18, 1950 R. P. BENNETT 2,515,944
REMOTELY CONTROLLED ACCURATE POSITIONING SYSTEM
Filed Jan. 17, 1949 2 Sheets-Sheet 1

Inventor
ROBERT P. BENNETT

By Killman and Kerst
Attorneys

July 18, 1950 R. P. BENNETT 2,515,944
REMOTELY CONTROLLED ACCURATE POSITIONING SYSTEM
Filed Jan. 17, 1949 2 Sheets-Sheet 2

Inventor
ROBERT P. BENNETT

By Killman and Kerst
Attorneys

Patented July 18, 1950

2,515,944

UNITED STATES PATENT OFFICE 2,515,944

REMOTELY CONTROLLED ACCURATE POSITIONING SYSTEM

Robert P. Bennett, Braddock Heights, Md., assignor to Bendix Aviation Corporation, Towson, Md., a corporation of Delaware Application January 17, 1949, Serial No. 71,300

5 Claims. (Cl. 318—31)

1

This invention relates to a system for remotely controlling the positioning of an angularly movable device.

There is a wide need for reliable, versatile and lightweight systems for accomplishing the accurate positioning of angularly movable devices from a distant control station. Such a need is particularly felt in the control of aircraft equipment, since many remotely positioned devices must be controlled from a few central locations. It is known to use for such purposes electrical signal repeating devices which have come to be known generally as synchros, in which the positioning of an element in one unit of the system causes a corresponding element in a remotely located unit of the system to take up a like position.

These devices, however, suffer from the defect that they have a very small torque capacity. This necessitates the use, at the object to be positioned, of a means for amplifying the torque without impairing the accuracy of the system. The use of torque amplifiers has not, in the past, been completely successful due to the introduction of excessive complexity into the system, the size and weight of components and reaction of the torque amplifier upon the signal repeating system in a manner to impair its accuracy.

It is an object of the present invention to provide a remote control system which will positively lock the driven object accurately in a desired position.

It is a further object of the invention to provide a remote control system in which torque amplification is employed without the introduction of complex, heavy or bulky components.

It is another object of the invention to provide a remote control system in which torque amplification is used, wherein the torque amplifying mechanism does not react upon the signal reproducing means.

These and other objects and advantages of the invention will become apparent from a consideration of the following specification together with the accompanying drawings, in which.

The objects and advantages of the invention are realized by a system in which the remote device to be controlled is normally locked accurately in a previously desired position by a mechanically actuated clutch and indexing arrangement. Magnetic means for inactivating the clutch is provided, the latter means being actuated from the control station in connection with the signaling operation. The signal repeating means is a synchro system.

Figures 1, 2:
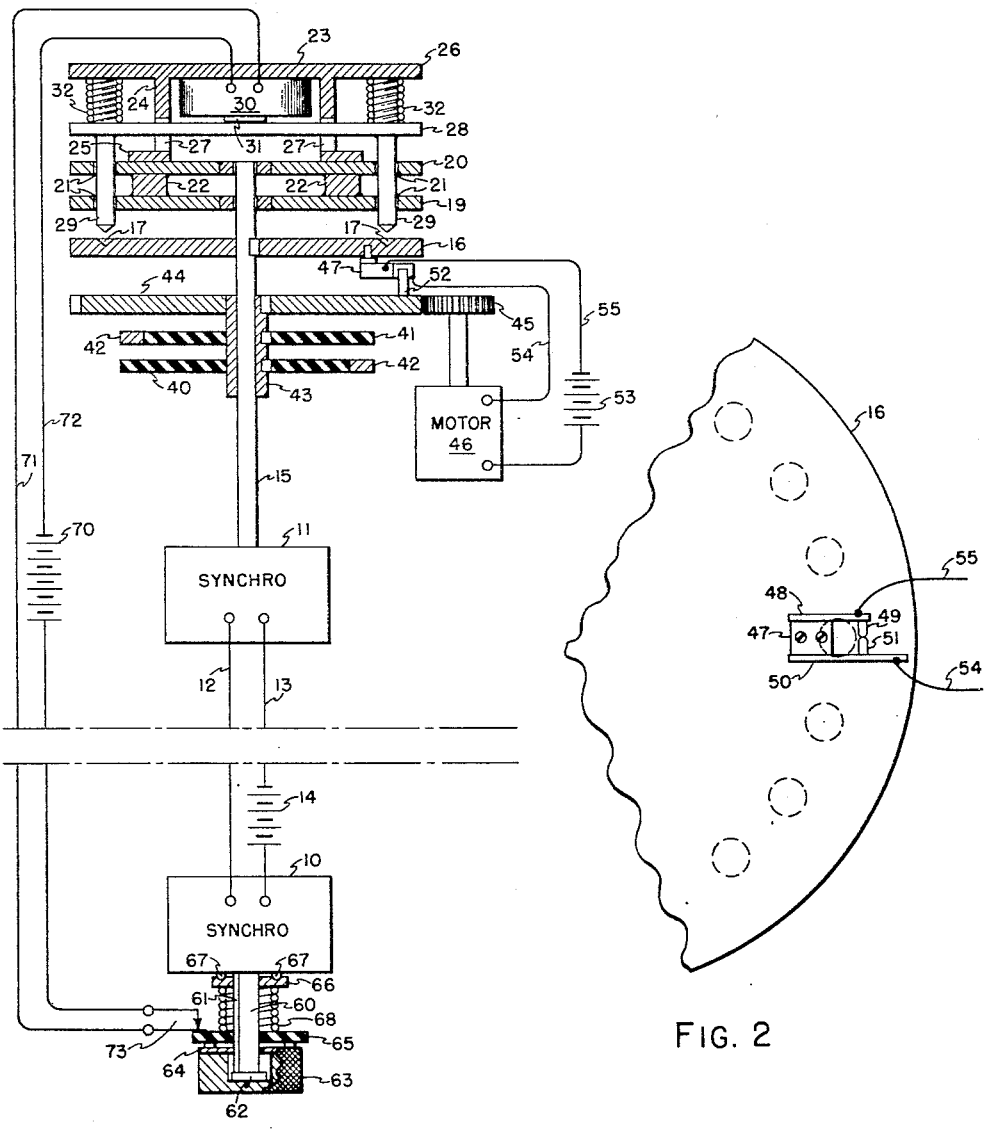
Fig. 1 is a schematic diagram of a remote control system embodying the invention, showing the mechanical portions of the system partly in section.
Fig. 2 is a plan view of a fragment of the system showing the motor control switch.

Referring now more particularly to the drawing, Fig. 1 illustrates a remote control system for positioning a turret type of switching means to any one of a number of preselected angular positions. While it is shown as being used for this purpose it is obvious that it is available for the remote control of a large variety of angularly positionable devices.

The signal repeating system comprises a synchro transmitter 10 located in the control station and a remotely located synchro receiver 11 located in the vicinity of the object to be positioned. The synchro system is shown as of the D. C. variety with its units connected by a pair of conductors 12 and 13 and powered by a battery 14. The rotor shaft 15 of the synchro receiver has secured to it for rotation therewith an indexing plate 16. The latter has formed in its upper surface a series of conical depressions 17, spaced around the peripheral portion of the surface at points corresponding to the desired angular positions of the object to be controlled. The indexing plate has a much lower moment of inertia than the object to be controlled and thus requires much less torque for its rotation.

Located above the index plate 16 and coaxial therewith are a pair of spaced discs 19 and 20 each having a pair of holes 21 formed near its periphery and so located that they will coincide with any diametrical pair of the coaxial depressions formed in the indexing plate when the latter is properly oriented. The discs are secured, by means not shown, against movement. The shaft 15 extends into axial holes formed in the discs, the discs acting as journals for the shaft. The discs are secured together by spacers 22.

Rigidly mounted upon the disc 20 is a housing 23 of generally cylindrical shape. Its central portion comprises a cylinder 24 terminating at its lower edge in a flange 25 which secures the housing to the disc 20. The cylinder is surmounted by a flat overhanging top including a flange portion 26. Formed at diametrically opposite points of the cylinder are a pair of vertical slots 27 accommodating an elongated flat member 28. Secured to the lower surface of the member 28 are a pair of plungers 29 which extend downwardly through the holes 21. The plungers are provided with conically shaped tips which are formed to fit accurately within the depressions 17. A pair of compression springs 32 are positioned between the flange 26 and the ends of the member 28 and tend to force the member down to the bottom of the slots 27. When it is in this position the lower ends of the plungers are in forcible contact with the bottoms of the depressions 17.

Located within the housing above the member 28 is a solenoid 30 having an armature 31. When the solenoid is deenergized the armature rests upon the top of the member 28, the latter being of magnetic material. Or the armature may be attached to the top of the member 28. The solenoid is strong enough to withdraw the member 28 and the plungers 29 against the pressure of springs 32 until the plungers are clear of the indexing plate 16.

The object to be positioned is illustrated as a turret type of switch composed of two switch plates 40 and 41 of insulating material bearing at their peripheries metal inserts 42 which function as contacts. The switch plates are keyed to a sleeve 43 journalled around the shaft 15 and rotatable thereabout. Also keyed to the sleeve 43 is a spur gear 44 which meshes with a pinion 45 driven by a motor 46.

The sleeve 43 is secured by means not shown against axial movement. The spur gear and the indexing plate 16 coact, by means to be described, to control the operation of the motor 46. The indexing plate has secured to its underside near its periphery a switch 47 which is more clearly shown in Fig. 2. The switch is formed on a block of insulating material secured to the indexing plate. Secured along one side of the block is an arm 48 carrying a contact point 49. Another arm 50 is secured along the opposite side of the block. This arm carries a contact point 51 which is normally in contact with the point 49. The contact arm 50 is longer than arm 48 and extends radially outward beyond the end of arm 48. The spur gear 44 has extending from its upper surface a pin 52 which is so positioned as to strike the outer end of the arm 50 of switch 47 when the spur gear is properly oriented. It will be seen that if the spur gear is rotated sufficiently in a counterclockwise direction the pin 52 will strike the arm 50 and the switch will be opened. The motor 45 is powered from a source 53 through a pair of conductors 54, 55 the circuit being completed through the switch 47.

Turning again to the control station end of the system, the rotor positioning mechanism of the synchro transmitter 10 comprises a rotor shaft 60 extending from the unit. The shaft is fitted with a spline 61 and terminates in an enlarged end 62. Fitted over the end is a knurled knob 63, formed with a central hollow into which the end of the shaft extends. The bottom of the knob has attached thereto a plate 64 shaped to fit snugly about the shaft and conform to the spline, whereby the shaft may be rotated by turning the knob. The knob may be moved along the shaft by the distance between the enlarged end 62 of the shaft and the plate 64.

Secured to the plate 64 is a second plate 65 of insulating material. Slidably carried on the shaft 60 and shaped to conform to the spline is a plate 66 provided on its side nearest the transmitter 10 with a circular series of indentations having the same angular disposition as the conical depressions 17 in the indexing plate 16. Secured to the transmitter are a pair of knobs or bosses 67 diametrically disposed with respect to the plate and so located as to fit into indentations of the plate 66. A compression spring 68 surrounds the shaft 60 between the plates 66 and 65 forcing the knob 63 to the end of the shaft and maintaining the plate 66 pressed against the bosses 67.

The solenoid 30 is powered from a source 70 through a pair of conductors 71, 72, the circuit being completed through a switch 73 located just behind the knob 63. The switch 73 is normally open, being closed by the plate 65 when the knob 63 is pressed in until the end of shaft 6 is in contact therewith.

In the operation of the system the knob 63 is normally pressed out to the end of shaft 60, the switch 73 is open and the solenoid 30 is consequently deenergized. In this condition the springs 32 press down the member 28 and seat the ends of the plungers in the conical depressions 17 locking the indexing plate 16 against rotation. With the plate 16 locked the spur gear 44 will have been rotated until the pin 52 opens the switch 47 and deenergizes the motor 46. The pin 52 will be held in this position and the switch plates 40 and 41 will likewise be locked in the last desired position.

If it is desired to turn the switch plates to a new angular position the knob 63 is first pressed in to the position shown. This closes switch 73, energizes the solenoid 30 and withdraws the plungers 29 clear of the plate 16 as shown. The knob 63 is now turned in a clockwise direction. This turns the shaft 60 which carries with it the plate 66. The plate 66 would preferably carry a pointer coacting with a scale on the transmitter 10 or other fixed surface. The bosses 67 act as detents with the plate 66. The knob is turned to the desired angular position. The synchro system now turns the indexing plate 16 in the same direction, the only torque required being that necessary to overcome the inertia of the shaft 15 and the plate 16. The plate 16 is turned until it takes up a position corresponding to the position of the knob 63. As the switch 47 moves away from the pin 52 it closes, thus causing power to be applied to motor 46 and the gear 44 to be rotated in a follow-up action. When the indexing plate 16 comes to rest the knob 63 is released opening switch 73 and deenergizing solenoid 30. The plungers 29 are now driven by the springs 32 down into the depressions 17 which lie under them. The conical shape of the depressions and the plunger ends causes the plate 16 to be accurately indexed into the desired position.

As the pin 52 is driven into contact with the switch arm 50, the switch 47 is opened and the motor 46 deenergized.

The embodiment just described permits only of rotation of the system in one direction. If two way rotation is desired some modifications in the system must be made.

Figure 3:
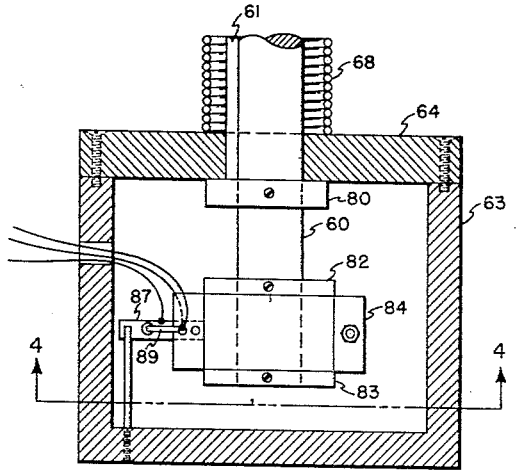
Fig. 3 is a cross-sectional view of the control knob portion of a modification of the embodiment of Fig. 1.
Figure 4:
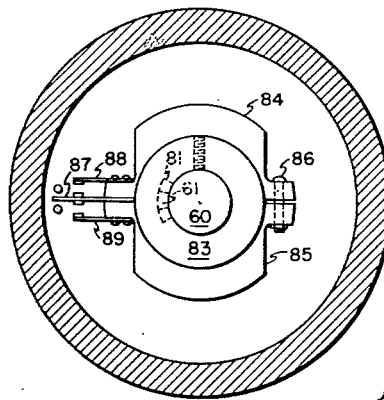
Fig. 4 is a cross-sectional view of the portion shown in Fig. 3, the section being taken along the line 4—4 and looking along the axis of the control knob shaft.
Figure 5:
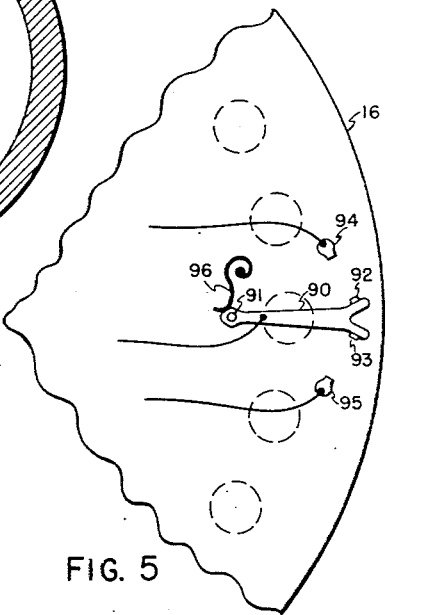
Fig. 5 is a view similar to that of Fig. 2 showing a single pole, double throw switch used for two way operation of the system.

Figs. 3, 4 and 5 illustrate modifications to the system of Figs. 1 and 2 for this purpose. Figs. 3 and 4 relate to the control knob portion of the system employing the same control knob 63 mounted upon the splined shaft 60. Although it is not necessary in this modification to depress the knob 63 upon the shaft, the spring 68 is retained to provide the desired detenting action in connection with the bosses 67 of Fig. 1. The spring forces the knob 63 against a collar 80 secured to the shaft. The bottom plate 64 is slotted as shown at 81 in Fig. 4 to receive the spline 61. The slot 81 is wider than the spline to allow some rotational movement of the knob before the shaft is engaged.

A pair of spaced collars 82 and 83 are fixedly secured near the end of the shaft. Positioned between them and secured against axial movement on the shaft is a switch assembly comprising a pair of half cylindrical complementary members 84 and 85 of insulating material each provided with diametrically opposed bosses. The members 84 and 85 are secured together around the shaft in a manner to permit relative rotation therewith, the friction between the assembly and the shaft being regulated by the screw 86.

Secured between one pair of bosses is a leaf contact element 87 having considerable resiliency. Secured to the outer surfaces of these bosses are a pair of contacts 88 and 89 which are normally not touching contact 87. A pair of posts are carried by the knob 63, one being located on each side of the end of contact 87. Leads from the three contacts connect to the battery 70 and solenoid 30 of Fig. 1 so that energization of the solenoid will occur upon the making of contact between contact element 87 and either of the others.

In the operation of this embodiment rotation of the knob 63 in either direction will cause the knob to turn relative to the shaft until the spline 61 reaches an end of the slot 81. By this time the contact element 87 will have come into contact with one of the other contact elements with enough force to bend the element 87. Energization of the solenoid will ensue and will continue until the knob is released. When this occurs the springiness of the element 87 will continue to rotate the switch assembly until the contacts open.

In order to drive the indexing plate 16 in either direction a reversible motor and a motor switching mechanism which will operate in either direction of rotation of the indexing plate must be used. Such a switching device is shown in Fig. 5 in which the single pole double throw switch arm 90 is shown mounted to rotate about an axle 91 near the rim of the plate 16. The arm is bifurcated at its free end and has a pair of contact points 92 and 93 formed on the outer surface of the bifurcations. A pair of contact elements 94 and 95 are fixed to the plate in an insulated manner and so located as to make contact with the points 92 and 93 respectively when the arm 90 is swung about its axis. The pivoted end of the arm has an extremity of constant radius from the axis, but the lateral portions of this end decrease in radius. A leaf spring 96 presses against the end of the arm. Leads extend from the arm and the elements 94 and 95 to a reversible motor. In operation when the system is idle the pin 52 shown in Fig. 1 is normally positioned between the bifurcations of the arm 90 which will lie in the position shown in Fig. 5. Upon rotation of the gear 44 the pin 52 will rotate the arm 90 about its axis until it contacts one of the elements 94 or 95. Very little torque will be required for this action because of the camming action of the spring 96 upon the end of the arm due to the reducing radius of the lateral portions of this end. This rotation of the arm 90 will permit the pin 52 to escape from the forked end of the arm. When the follow-up action occurs the pin will again open the switch.

Many departures may be made from the embodiments disclosed without departing from the scope of the invention. For example, other forms of switches than those shown at 47 and 73 could be used. Many other such changes will occur to those skilled in the art.

What is claimed is:

1. A system for remotely controlling the angular movement of an object comprising a signalling system, a member movable by the operation of said signalling system to a position commensurate with the desired position of said object, a clutch normally locking said member against movement, means operable in connection with the operation of said signalling system to declutch said clutch, means for driving said object in angular movement, a power source for said driving means, means carried by said member and actuatable to disable said power source, said disabling means being normally unactuated, and means operable by the angular movement of said object to actuate said disabling means when said object is positioned in said desired angular position.

2. Means for the remote control of the angular position of an object comprising a signalling system, said signalling system comprising means in a remote location for transmitting a signal commensurate with the desired angular position of said object and means in the vicinity of said object responsive to said signal and including a member oriented by the reception of said signal to an angular position commensurate with the desired angular position of said object, means normally locking said member against movement, means operable from said remote location for releasing said locking means, means for driving said object in angular movement, a power source for said driving means, means carried by said member and actuatable to disable said power source, said disabling means being normally unactuated, and means operable by the angular movement of said object to actuate said disabling means when said object is positioned in said desired angular position.

3. A system for remotely controlling the angular movement of an object comprising a member located in the vicinity of said object and having a lower moment of inertia than said object, a signalling system operable to move said members approximately into any one of a number of preselected positions, clutch means operable to convert an approximate placement of said member with respect to any of said positions to an accurate placement with respect thereto and to lock said member in said position, means operable to disable said clutch means during the operation of said signalling system, means for driving said object in angular movement and means responsive to the relative positions of said member and said object and operable to interrupt the operation of said driving means when said object reaches a position bearing a selected relation to the position of said member.

4. A system for remotely controlling the angular movement of an object comprising a member located in the vicinity of said object and having a lower moment of inertia than said object, a signalling system operable to move said member with approximate accuracy to any one of a number of preselected positions, mechanically actuated clutching and positioning means coacting with said member when it is approximately located with respect to one of said positions to move it accurately into said position and to hold it there, magnetic means operable with said signalling means to withdraw said clutching means from said member, means for driving said objects in angular movement and means responsive to the relative positions of said member and said object to interrupt the operation of said driving means when said object reaches a position bearing a selected relation to the position of said member.

5. A system for remotely controlling the angular movement of an object comprising: a member located in the vicinity of said object and having a lower moment of inertia than said object, a signalling system operable to move said member with approximate accuracy to any one of a number of preselected positions, means coacting with said member and operable upon the termination of the operation of said system to accurately position said member in the selected one of said positions, a switch carried by said member and angularly movable therewith, means for driving said object, said means including an element angularly movable coaxially with said member and adjacent thereto, a power source for said driving means, means including said switch for connecting said source to said driving means, said switch normally being closed, and means carried by said element and angularly movable into switch opening contact with said switch when said object reaches an angular position bearing a predetermined relation to the position of said member.

ROBERT P. BENNETT.

REFERENCES CITED

The following references are of record in the file of this patent:

UNITED STATES PATENTS

| Number | Name | Date |
|--------|------|------|
| 1,135,040 | Missbach | Apr. 13, 1915 |
| 1,197,001 | Wood | Sept. 5, 1916 |
| 1,559,525 | Murphy et al. | Oct. 27, 1925 |
| 1,564,872 | McMullen | Dec. 8, 1925 |